Feb. 9, 1954     E. E. MARTIN     2,668,636
POPCORN DISPENSER EMPLOYING AIR ENTRAINMENT
MEANS FOR CORN TRANSFER
Filed Aug. 28, 1948     3 Sheets—Sheet 1
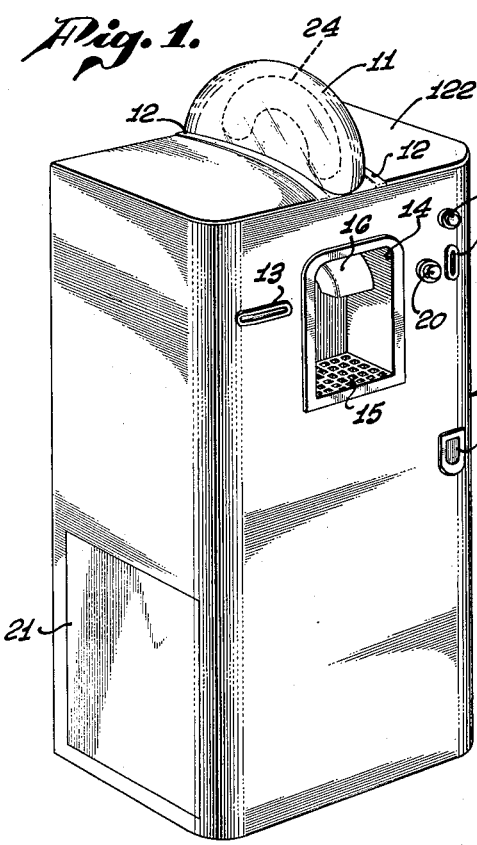
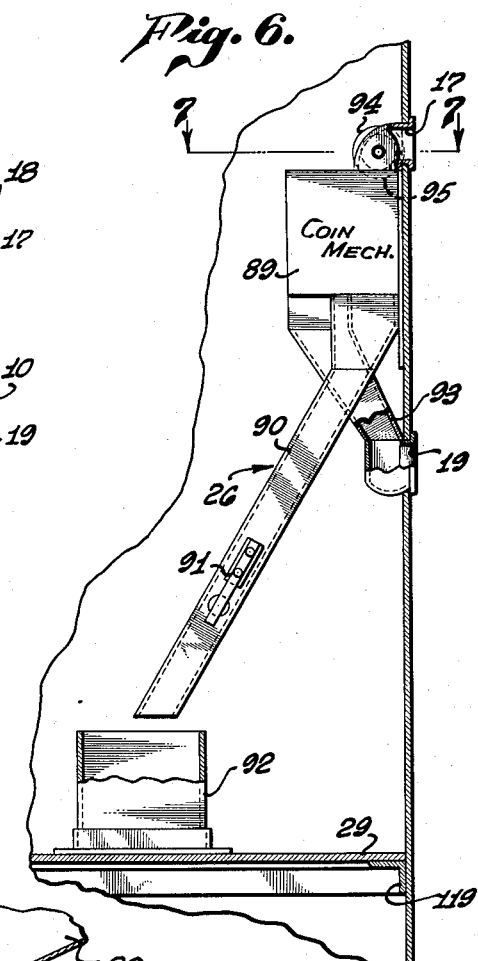
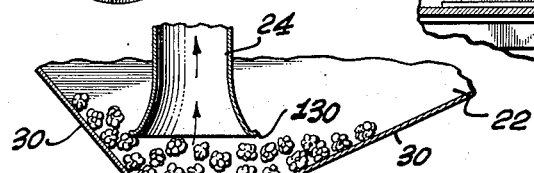
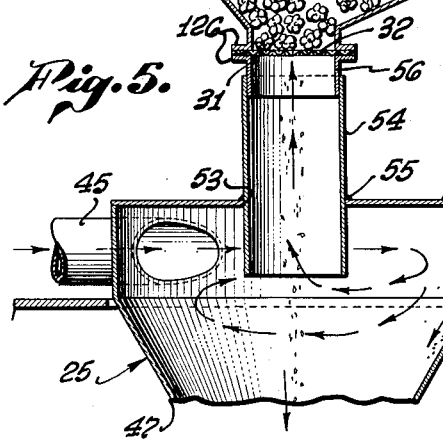
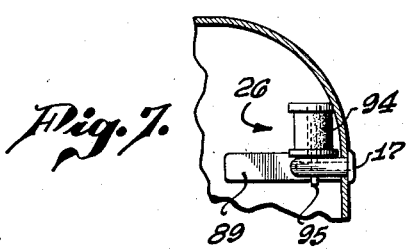
INVENTOR.
EARNEST E. MARTIN,
BY
ATTORNEY.

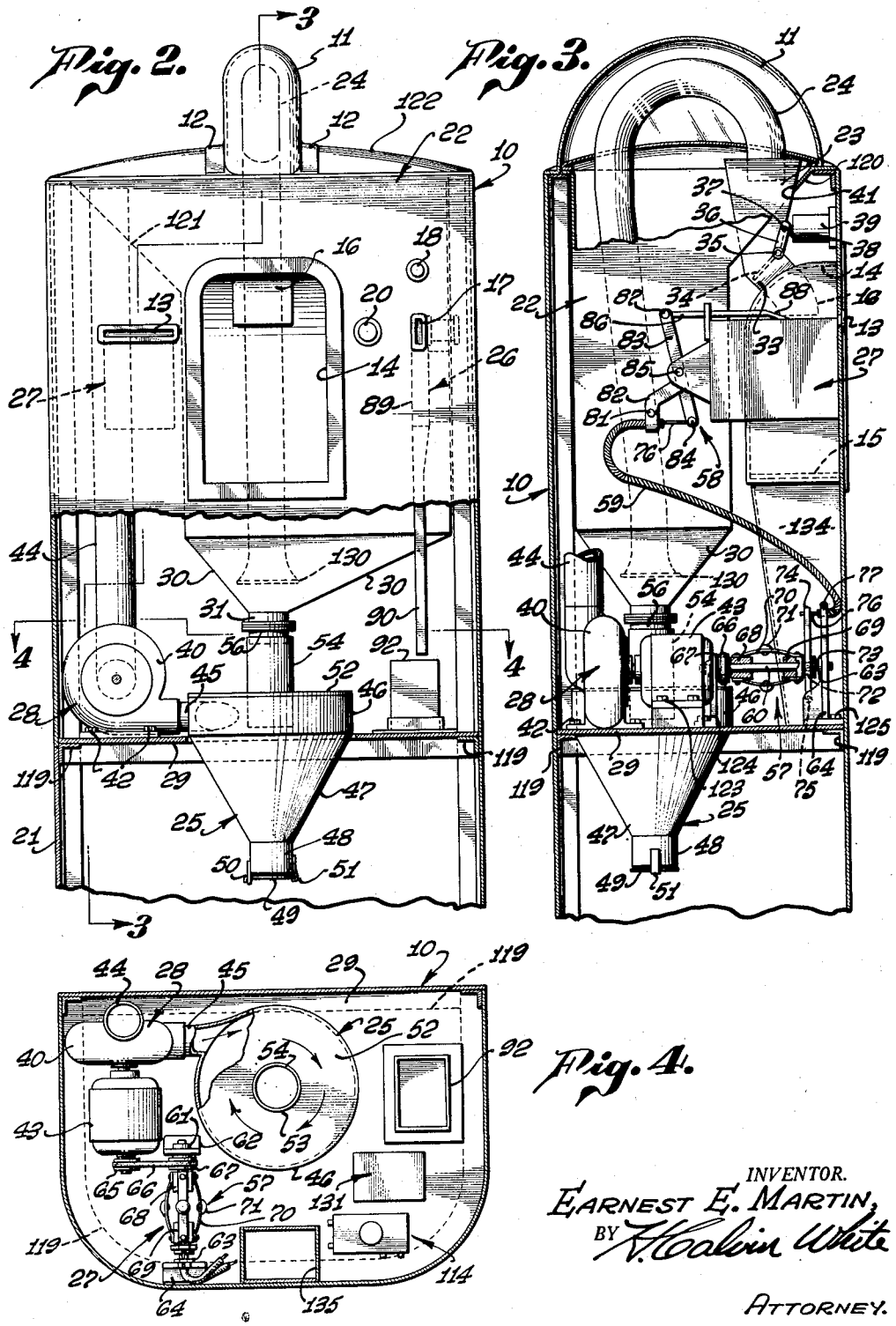

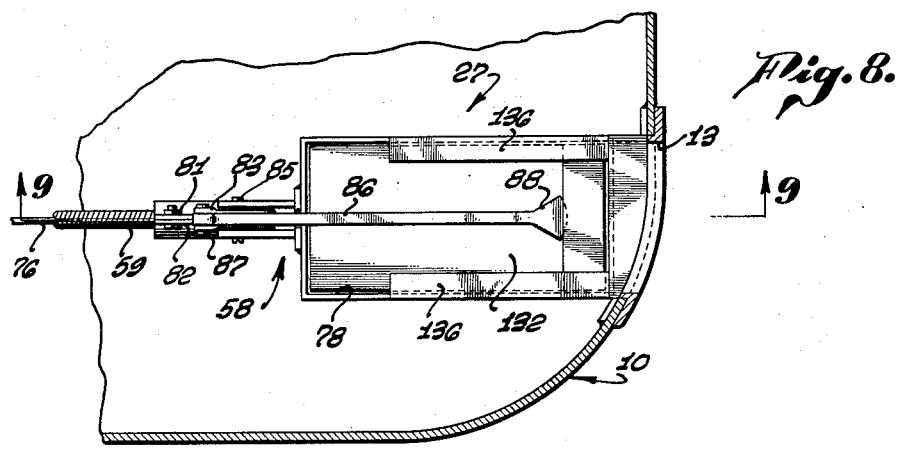
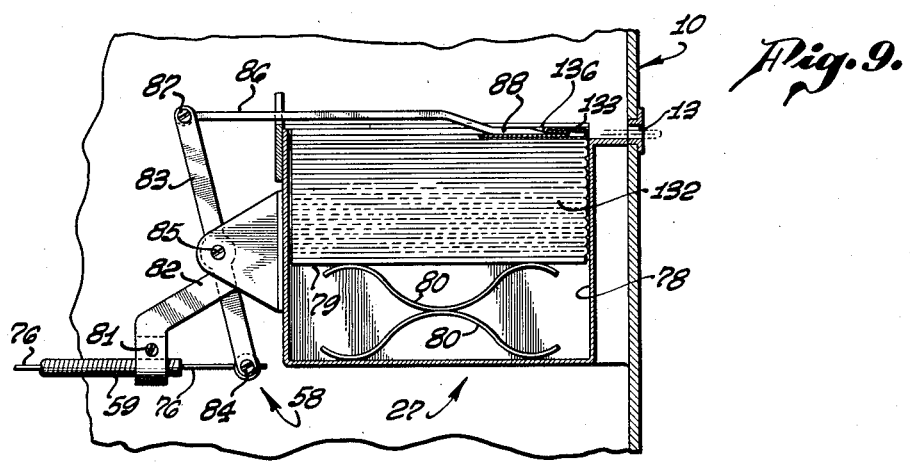
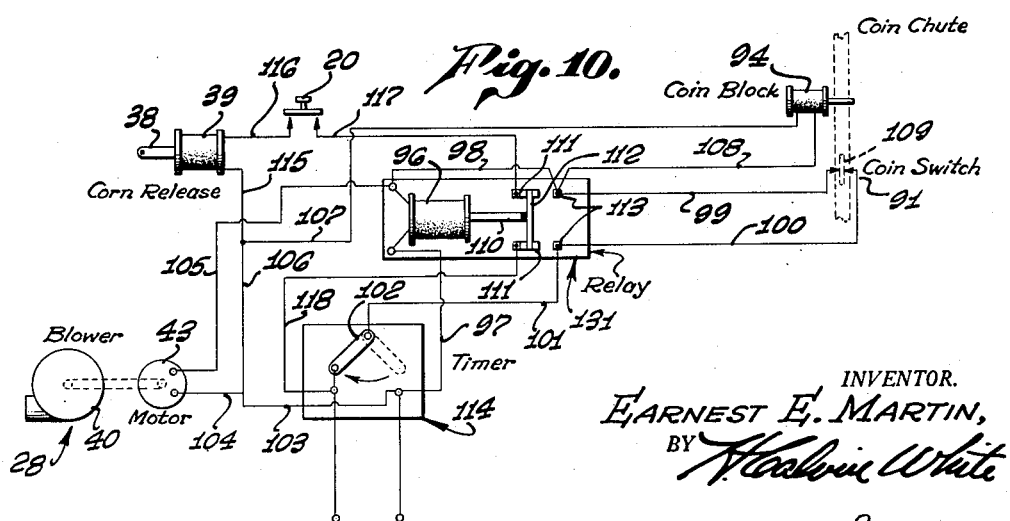

Patented Feb. 9, 1954

2,668,636

UNITED STATES PATENT OFFICE 2,668,636

POPCORN DISPENSER EMPLOYING AIR ENTRAINMENT MEANS FOR CORN TRANSFER

Earnest E. Martin, Pasadena, Calif., assignor to Sidney Fischgrund, John E. Beall, and Willis E. Clark, Los Angeles, Calif.

Application August 28, 1948, Serial No. 46,597

21 Claims. (Cl. 222—2)

This invention relates generally to improved popcorn vending equipment adaptable for coin control to dispense during periodic operation, a measured or predetermined quantity of corn to be taken into a bag or other appropriate container. Particularly the invention is directed to novel popcorn and dispensing equipment in which the corn is air-entrained for transference from one location to another and is rendered attractively visible in a state of agitation during the course of such transference.

In its preferred embodiment, the invention serves as a popcorn dispensing machine operable to deliver a predetermined quantity of corn at each operation by creating, in response to coin-controlled actuation, a temporary flow of air to transfer the corn from a supply chamber to a measuring container. Thus the coin control may function to start in operation a blower which creates and temporarily maintains a corn-entraining flow of air during a period sufficient for transference of the quantity to be dispensed.

To measure exactly the quantity of corn to be delivered at each operation, the machine may be equipped with a collection chamber of predetermined capacity adapted to receive the transferred corn but to retain only the desired amount, preferably returning any excess to the storage chamber in which it had been initially contained. The collection chamber may be provided with dispensing means permitting the operator to release the transferred corn into a suitable container, such as the usual popcorn bag. To assure accuracy of measurement, the dispensing means are preferably operable only after the transfer of corn to the collection chamber has been completed.

A delivery conduit or tube may be employed to guide the stream of air and entrained corn toward the delivery location. This tube may be transparent and at least partially visible to the operator to permit viewing of the corn in motion.

A particular advantage of the invention lies in the provision of novel means for removing from the machine virtually all of the undesirable elements normally found in popcorn to prevent their delivery to the operator. This result may be attained by a combination of centrifugal and gravity separation, whereby the relatively heavy unpopped grains are permitted to fall downwardly and out of the storage chamber, preferably through a screen, and the lighter weight fragments are removed with an air stream and then centrifugally separated by imparting a swirling motion to the air.

The invention also contemplates the use of means for ejecting a bag from within the machine to an accessible location, preferably in response to operation of a coin controlled mechanism. Such ejection may be effected in a novel manner assuring positive action while preventing damage to the bag during the ejecting process. To assure the smooth and relatively slow motion necessary to prevent bag injury, the ejecting mechanism is preferably operated by apparatus responsive to changes in speed of operation of the unit creating the corn transferring air stream. This speed responsive mechanism may comprise a centrifugal device rotatable with a blower and operable to slowly actuate the ejecting mechanism upon increase of blower speed.

The above and further features and objects of the present invention will be better understood from the following detailed description of the typical embodiment illustrated in the accompanying drawings, in which:

Fig. 1 is a perspective view of a coin operated corn dispensing machine;

Fig. 2 is a fragmentary vertical section through the machine of Fig. 1;

Fig. 3 is a vertical section taken on line 3—3 of Fig. 2;

Fig. 4 is a horizontal section taken on line 4—4 of Fig. 2;

Fig. 5 is an enlarged fragmentary vertical section through the upper part of the centrifugal separator and the lower part of the popcorn storage chamber;

Fig. 6 is a fragmentary side view of the coin responsive mechanism, partly in section;

Fig. 7 is a fragmentary horizontal section taken on line 7—7 of Fig. 6;

Fig. 8 is a fragmentary plan view of the bag ejecting mechanism;

Fig. 9 is a fragmentary vertical section taken on line 9—9 of Fig. 8; and

Fig. 10 is a schematic representation of the electrical control system.

Referring first to Fig. 1, the corn dispensing machine there illustrated is contained within a substantially rectangular housing 10 having a transparent central dome 11, which may be secured to the top of the housing by straps 12. The front of the housing contains a narrow bag ejection slot 13 and a corn delivery alcove 14 having a bottom screen 15 and a delivery spout 16. Coin slot 17 is adapted for the reception of the particular type coin required to set the apparatus in operation, and has associated with it the usual coin return button 18 and opening 19.

Push button 20 is provided for releasing a measured quantity of corn from the spout after a coin has been inserted and an internal measuring process, later to be described, has been completed. The lower portion of the machine may be open at one side, as at 21, to provide a freely accessible chamber for storage of extra corn or bags.

Referring now to the other drawings, and particularly to Figs. 2, 3 and 4, the interior of the machine is divided into upper and lower chambers by horizontal partition 29, which may be supported by angle irons 119, suitably secured to the housing wall. The operating mechanism is contained above the partition, leaving the lower chamber unoccupied and free for use as an auxiliary storage space. The device comprises generally storage chamber 22, collection chamber 23 together with the associated dispensing apparatus, delivery tube 24 leading from the lower portion of the storage chamber to the collection chamber, centrifugal separator 25, coin responsive control mechanism 26, bag ejecting mechanism 27, and blower unit 28 for creating a corn transferring flow of air through the separator, into the lower portion of the storage chamber, and upwardly through tube 24 toward the collection chamber.

Storage chamber 22, occupying much of the space above the partition, is adapted to contain a substantial quantity of the corn to be dispensed. Its major extent is rectangular in horizontal section and is located near the rear and right hand sides of the machine, being spaced from the left hand side (see Fig. 2), from the front of the machine (see Fig. 3), and from the partition, to afford adequate room for the various mechanical and electrical units required for operation of the machine. Angularly disposed walls 120 and 121 enlarge the sectional area of the chamber near the top to approximately the size of the machine itself, with the top 122 of the machine serving as top also for the storage chamber. The chamber converges downwardly at 30 to a circular bottom opening 31. Screen 32 is disposed across opening 31 between retaining flanges 126 and serves to separate the small and relatively heavy unpopped grains by permitting them to fall downwardly while retaining the popped corn. Tube 24 may be flared slightly outwardly at its lower extremity 130, and is spaced a short distance above opening 31 in the chamber. The tube extends upwardly at a slight angle, as seen in Fig. 3, and makes a return bend to project downwardly over collection chamber 23.

The collection chamber extends through and is secured within opening 41 in sloping front wall 120 of the storage chamber, and is therefore disposed partially within and partially outside of the storage chamber. The collection chamber is open at the top for the reception of corn and converges downwardly to a relatively narrow throat 33, which is normally closed by door 34. The door is pivoted at 35 and controlled by external arm 36 which is connected at 37 to armature 38 associated with solenoid 39.

Blower unit 28 comprises a centrifugal blower 40, mounted upon partition 29, as by bolts 42, and a driving motor 43, secured to the partition by bolts 123. The blower takes air from the upper portion of storage chamber 22 through intake tube 44, and discharges it substantially tangentially into centrifugal separator 25 at 45. The intake air entering tube 44 carries with it, for removal by the separator, any small shell fragments and other light weight particles that have been intermingled with the corn.

The separator has an upper cylindrical portion 46 for directing the tangentially injected air stream in a circular path, beneath which it presents a downwardly converging frusto-conical portion 47. The light weight particles 135 removed from the storage chamber are urged outwardly by centrifugal force to accumulate along the separator wall and fall toward discharge tube 48. The lower end of tube 48 is normally closed by door 49, which is hinged at 50 and retained in closed position by latch 51. Horizontal wall 52 forms a top for the separator, permitting air escape only through central opening 53, within which vertical tube 54 is secured, as by welding at 55. Tube 54 communicates upwardly with depending tube 56 from the storage chamber.

Bag ejecting mechanism 27 is operated by motor 43 in a novel manner resulting in smooth relatively slow ejection as the motor and blower accelerate. The ejecting apparatus comprises a speed responsive element, generally indicated at 57, operable to actuate mechanical ejecting element 58 through flexible rod 76. The speed responsive element includes a shaft 60 rotatably retained between bearing 61 in support 62 and bearing 63 in support 64. Supports 62 and 64 are suitably secured to partition 29, as by bolts 124 and 125, respectively. Shaft 60 is driven by the motor through pulley 65, belt 66 and pulley 67. Sleeve 69 is axially movable along the shaft and normally spaced as illustrated from sleeve 68, which is rigidly secured to the shaft. Resilient straps 70 extend between these sleeves and carry weights 71 at their mid-points. Sleeve 69 contains an annular external recess 72, within which rollers 73 carried by control arm 74 are receivable. Arm 74 is pivotally attached to support 64 at 75 and at its upper end to flexible control rod 76, whose guiding cable 59 is clamped to support 64 at 77.

Bags 132 are stacked in horizontal position within rectangular compartment 78 (see Figs. 8 and 9), and are carried by plate 79, which is urged upwardly by springs 80. Upward movement of the bags is limited by side flanges 136 which extend inwardly at the top of compartment 78 and retain the uppermost bag opposite slot 13. The upper end of control rod cable 59 is secured by screw clamp 81 to support 82 which extends outwardly from the bag chamber. Lever 83 is pivotally secured at 84 to control rod 76 and is pivotally retained by support 82 at 85. Ejector arm 86 is pivoted to the upper end of lever 83 at 87 and presents a terminal downwardly offset ejecting finger 88 for successively engaging the bottom folds on the various bags to move the bags out through slot 13 to the dotted line position of Fig. 9.

Coin responsive mechanism 26 (see Fig. 6), presents a slot 17 from which an inserted coin passes to coin selector 89. A proper coin passes downwardly through passageway 90 to momentarily bridge the contacts of switch 91 and then fall into coin box 92. If coin return button 18 is operated or the coin is an improper one, it returns through passageway 93 to opening 19 for recovery by the operator. Coin block solenoid 94 is energized during operation of the blower to urge armature 95 into blocking relation with the coin slot and thereby prevent the insertion of another coin while a delivery is being made.

In operation, a coin 109 inserted at 17 momentarily bridges the gap between the contacts of coin switch 91 to simultaneously energize coil 96 of relay 131, blower motor 43, and coin block solenoid 94. Referring to Fig. 10, the circuit to the relay coil comprises lines 97, 98 and 99, coin 109, lines 100 and 101, and arm 102 of timer 114. The motor is energized through lines 103, 104, 105, 98 and 99, coin 109, lines 100 and 101, and timer arm 102. Coin block solenoid 94 is in a circuit including lines 103, 105, 107, 108 and 99, coin 109, lines 100 and 101, and arm 102. Thus, immediately upon insertion of a coin, the blower is set in operation, armature 95 blocks the coin pasageway against insertion of another coin, and relay armature 110 is moved to the right.

Normally, relay armature 110 and contact arm 112 are in the position of Fig. 10, in which the contact arm closes the circuit across contacts 111. However, when the solenoid is energized, upon insertion of a coin, the armature is urged to the right to cause arm 112 to close contacts 113. Since coin switch 91 is connected across contacts 113, the closing of these two contacts by arm 112 serves to by-pass the coin switch and maintain the circuits to the motor, coin block and relay coil closed, even after the coin has passed the coin switch. These three circuits then remain closed until arm 102 of timer 114 moves to the open position, shown in broken lines.

The blower draws air through intake 44 from the upper part of storage chamber 22 and injects it tangentially into separator 25 where any shell fragments or other small particles initially entrained in the air are separated and fall downwardly for removal through tube 48. After the air has made several revolutions in the separator, it passes upwardly through tubes 54 and 56, and screen 32, into the storage chamber. The air stream is then picked up by depending mouth 130 of delivery tube 24 to be directed through the tube to the collection chamber. In passing between screen 32 and the mouth of the delivery tube, the air entrains some of the popped corn at the bottom of the storage chamber to carry it through the tube into the collection chamber. Inasmuch as tube 24 and dome 11 are both transparent, this movement of the corn can be seen by the operator and thus produce an unusual visual effect.

Timer 114 is normally closed but designed to open the circuits to the blower, coin block and relay coil after the motor and blower have been in operation for a predetermined length of time. This operating period is sufficient in duration for approximately one bag full of corn to be carried upwardly through tube 24 to the collection chamber. Exact measurement is effected by the collection chamber, which has capacity to retain exactly one bag full of corn, any excess falling over its sides and back into the pile of corn within the storage chamber.

As the blower accelerates, upon insertion of a coin, speed responsive element 57 is rotated by the motor through belt 66 to urge weights 71 outwardly under the influence of centrifugal force. Such outward movement of the weights moves sleeve 69 toward sleeve 68 to pivot arm 74 about point 75 and thus move flexible control rod 76 longitudinally within cable 59. The control rod, in turn, pivots lever 83 about point 85 to move arm 86 forwardly and eject the top bag by engagement of its bottom fold 133. Because ejector arm 86 moves only as rapidly as the motor and blower accelerate, the ejecting motion is sufficiently gentle to assure that no injury to the bag can result.

The operator removes the ejected bag, opens it, places it under spout 16 which is an extension of collection chamber 23, and presses button 20. This closes the circuit to solenoid 39 (see Fig. 10) through lines 103, 106, 115, 116 and 117, arm 112, and line 118, to move armature 38, pivot arm 36, and thereby open door 34 to permit the corn to fall downwardly into the bag. Any corn which misses the bag falls through screen 15, chute 134 and opening 135 in the partition, into the bottom portion of the machine housing from which it may be removed.

Since contact arm 112 is included in the circuit to solenoid 39, that circuit cannot be closed while the arm is in the rightward position. Thus, the corn cannot be released from collection chamber 23 during operation of the blower. If this were not the case, an operator could obtain all of the corn which the blower transfers, and the excess over one bag would not be returned to the storage chamber.

I claim:

1. A popcorn dispenser comprising a housing having a transparent wall, a storage chamber within the housing for containing popcorn to be dispensed, an overflow collection chamber within the housing adapted to contain a predetermined quantity of popcorn and to overflow downwardly any corn received in excess of said quantity, means for creating a flow of air in the housing, means for entraining corn from the storage chamber in said flow of air, means directing the corn thus entrained along the inside of said transparent wall within sight from the outside of the housing and then into the collection chamber, coin responsive control means operable to energize said flow creating means, means for automatically deenergizing said flow creating means after its energization for a period sufficient to fill the collection chamber with corn and means for dispensing the corn from the collection chamber.

2. A popcorn dispenser comprising a housing having a transparent wall, a storage chamber within the housing for containing popcorn to be dispensed, an overflow collection chamber within the housing adapted to contain a predetermined quantity of popcorn and to overflow downwardly any corn received in excess of said quantity, means for creating a flow of air in the housing, means for entraining corn from the storage chamber in said flow of air, means directing the corn thus entrained along the inside of said transparent wall into the collection chamber, means within the housing for receiving a supply of containers, means for ejecting a single container from said supply, coin responsive control means operable to energize said flow creating and said container ejecting means, means for automatically deenergizing said flow creating means and said container ejecting means after a period sufficient to fill the collection chamber with corn and sufficient to eject one container, and means for dispensing the corn from the collection chamber to be received in the ejected container.

3. A popcorn dispenser comprising a housing having a dome with a transparent wall, a storage chamber within the housing for containing popcorn to be dispensed, an overflow collection chamber within the housing adapted to contain a predetermined quantity of popcorn and to overflow downwardly any corn received in excess of said quantity, means for creating a flow of air upwardly within the housing and toward the dome, means for entraining corn from the storage chamber in said flow of air to pass upwardly therewith toward the dome, means for directing the corn thus entrained along the inside of the transparent dome within sight from the outside of the housing and then into said collection chamber, control means operable to energize said flow creating means upon reception of a coin, means for automatically de-energizing said flow creating means after its energization for a period sufficient to fill the collection chamber with corn, and means for dispensing the corn from said collection chamber.

4. A popcorn dispenser comprising a housing having a dome with a transparent wall, a storage chamber within the housing for containing popcorn to be dispensed, an overflow collection chamber within the housing adapted to contain a predetermined quantity of popcorn and to overflow downwardly any corn received in excess of said quantity, means for creating a flow of air upwardly within the housing and toward the dome, means for entraining corn from the storage chamber in said flow of air to pass upwardly therewith toward the dome, means for directing the corn thus entrained along the inside of the transparent dome within sight from the outside of the housing and then into said collection chamber, means within the housing for receiving a supply of containers, means for ejecting a single container from said supply, coin responsive control means operable to energize for a period and then de-energize said flow creating means and said container ejecting means, and means for dispensing the corn from the collection chamber to be received by the ejected container.

5. A popcorn dispenser comprising a housing having an elongated transparent dome extending horizontally along its upper surface, a storage chamber within the housing for containing popcorn to be dispensed, an overflow collection chamber within the housing at a first end of the dome adapted to contain a predetermined quantity of popcorn and opening into the storage chamber to overflow downwardly any corn received in excess of said quantity, means for creating a flow of air upwardly within the housing and toward the other end of the dome, means for entraining corn from the storage chamber in said flow of air to pass upwardly therewith toward the dome, means for directing the corn thus entrained generally horizontally along the inside of the transparent dome toward said first end thereof within sight from the outside of the housing and then into said collection chamber, coin responsive means controlling the delivery of corn to the collection chamber by said flow creating means, and means for dispensing the corn from said collection chamber.

6. A popcorn dispenser comprising a housing having a transparent wall, a storage chamber within the housing for containing popcorn to be dispensed, a collection chamber within the housing, means for creating a flow of air in the housing, means for entraining corn from the storage chamber in said flow of air, means for directing the corn thus entrained along the inside of said transparent wall in sight of an operator of the dispenser and then into the collection chamber, coin responsive control means operable to energize said flow creating means, means for automatically de-energizing said flow creating means after its energization for a period sufficient to fill the collection chamber with corn, and means for dispensing the corn from the collection chamber.

7. Popcorn dispensing apparatus comprising a collection chamber at one location, a blower intermittently operable to create a flow of air from a second location toward said chamber, means for entraining popped corn in the air stream to be carried from said second location into the chamber, means for holding a supply of containers, means responsive to a change in the speed of operation of said blower to eject a container from said supply, and means for dispensing the corn from said chamber to be received in said ejected container.

8. Popcorn transferring apparatus comprising a collection chamber at one location, a blower intermittently operable to create a flow of air from a second location toward said chamber, a centrifugal control device rotatable upon operation of said blower and having a weight outwardly displaceable in response to such rotation, means for entraining popped corn in the air stream to be carried from said second location into the chamber, means for holding a supply of containers, means operable to eject a container from said supply in response to outward movement of the weight in said control device, and means for dispensing the corn from said chamber to be received in said container.

9. A popcorn dispenser comprising a housing, a storage chamber within the housing for containing popcorn to be dispensed, an overflow collection chamber carried by the housing adapted to contain a predetermined quantity of popcorn and to overflow downwardly any corn received in excess of said quantity, means for creating a flow of air in the housing, means for entraining corn from the storage chamber in said flow of air and then directing the entrained corn into the collection chamber, means operable to commence the delivery of corn to the collection chamber by said flow creating means, automatic control means operable to automatically interrupt said delivery after a period sufficient to fill the collection chamber with corn, and dispensing means then operable to discharge the corn from the collection chamber while the delivery of corn to the collection chamber is stopped, said collection chamber and dispensing means being constructed to retain the transferred corn within the collection chamber during said delivery of corn to the collection chamber.

10. A popcorn dispenser comprising a housing, a storage chamber within the housing for containing popcorn to be dispensed, an overflow collection chamber carried by the housing adapted to contain a predetermined quantity of popcorn and to overflow downwardly any corn received in excess of said quantity, means for creating a flow of air in the housing, means for entraining corn from the storage chamber in said flow of air and then directing the entrained corn into the collection chamber, means operable to commence the delivery of corn to the collection chamber by said flow creating means, control means including a timer automatically operable to interrupt said delivery after a period sufficient to fill the collection chamber with corn, and dispensing means then operable to discharge the corn from the collection chamber while the delivery of corn to the collection chamber is stopped, said collection chamber and dispensing means being constructed to retain the transferred corn within the collection chamber during said delivery of corn to the collection chamber.

11. A popcorn dispenser comprising a housing, a storage chamber within the housing for containing popcorn to be dispensed, a collection chamber carried by the housing, means for creating a flow of air in the housing, means for entraining corn from the storage chamber in said flow of air and directing the corn thus entrained into the collection chamber, means operable to energize said air flow creating means, automatic control mechanism operable to automatically de-energize said flow creating means after its energization for a period sufficient to deliver a predetermined quantity of corn to the collection chamber, and dispensing means then operable to discharge said quantity of corn from the collection chamber while the flow creating means are deenergized, said collection chamber and dispensing means being constructed to retain the transferred corn within the collection chamber during said delivery of corn to the collection chamber.

12. A popcorn dispenser comprising a housing, a storage chamber within the housing for containing popcorn to be dispensed, a collection chamber carried by the housing, means for creating a flow of air in the housing, means for entraining corn from the storage chamber in said flow of air and directing the corn thus entrained into the collection chamber, coin responsive means operable to commence the delivery of corn to the collection chamber by said flow creating means, automatic control means operable to automatically interrupt said delivery after a period sufficient to transfer a predetermined quantity of corn to the collection chamber, and dispensing means then operable to discharge said quantity of corn from the collection chamber to a location accessible from the outside of the housing, said collection chamber and dispensing means being constructed to retain the transferred corn within the collection chamber during said delivery of corn to the collection chamber.

13. A popcorn dispenser comprising a housing having a transparent wall, a storage chamber within the housing for containing popcorn to be dispensed, an overflow collection chamber adapted to contain a predetermined quantity of popcorn and opening into the storage chamber to overflow downwardly thereinto any corn received in excess of said quantity, means for creating a flow of air in the housing, means for entraining corn from the storage chamber in said flow of air and then directing the entrained corn along the inside of said transparent wall within sight from the outside of the housing and then into the collection chamber, coin responsive means operable to commence the delivery of corn to the collection chamber by said flow creating means, control means automatically operable to interrupt said delivery after a period sufficient to fill the collection chamber with corn, and means then operable to dispense the corn from the collection chamber to a location at the outside of the housing while the delivery of corn to the collection chamber is stopped.

14. A popcorn dispenser comprising a housing, a storage chamber within the housing for containing popcorn to be dispensed, a collection chamber carried by the housing, means for creating a flow of air in the housing, means for entraining corn from the storage chamber in said flow of air and directing the corn thus entrained into the collection chamber, means for controlling delivery of the corn to said collection chamber by the flow creating means, dispensing means for discharging the delivered corn from the collection chamber to a location accessible from the outside of the housing, said collection chamber and dispensing means being constructed to retain the transferred corn within the collection chamber during said delivery of corn to the collection chamber, and a coin responsive unit controlling both said delivery controlling means and said dispensing means.

15. A popcorn dispenser comprising a housing, a storage chamber within the housing for containing popcorn to be dispensed, a collection chamber carried by the housing, means for creating a flow of air in the housing, means for entraining corn from the storage chamber in said flow of air and directing the corn thus entrained into the collection chamber, means within the housing for receiving a supply of containers, means for ejecting a single container from said supply, a coin responsive unit operable to energize and automatically deenergize said flow creating means and said container ejecting means in predetermined timed relation to deliver a charge of corn to the collection chamber and eject one container, and means for then dispensing the corn from the collection chamber to be received by the ejected container, said collection chamber and dispensing means being constructed to retain the transferred corn in the collection chamber during the delivery of said corn to the collection chamber.

16. A popcorn dispenser comprising a housing having a transparent wall, a storage chamber within the housing for containing popcorn to be dispensed, a collection chamber carried by the housing, means for creating a flow of air in the housing, means for entraining corn from the storage chamber in said flow of air and directing the corn thus entrained along the inside of said transparent wall within sight from the outside of the housing and then into the collection chamber, means for controlling the delivery of corn to the collection chamber by said flow creating means, means within the housing for receiving a supply of containers, means for ejecting a single container from said supply, means for dispensing the delivered corn from the collection chamber to a location at the outside of the housing for reception in the ejected container, said collection chamber and dispensing means being constructed to retain the transferred corn within the collection chamber during said delivery of corn to the collection chamber, and a coin responsive unit controlling said delivery controlling means, said container ejecting means and said dispensing means.

17. A popcorn dispenser comprising a housing, a storage chamber within the housing for containing popcorn to be dispensed, a collection chamber carried by the housing, means for creating a flow of air in the housing, means for entraining corn from the storage chamber in said flow of air and directing the corn thus entrained into the collection chamber, means carried by said housing for receiving a supply of containers, means for ejecting a single container from said supply, control mechanism operable to energize and automatically deenergize said flow creating means and said container ejetcing means in predetermined timed relation to deliver a charge of corn to the collection chamber and eject one container, and means for then dispensing said charge of corn from the collection chamber into the ejected container, said collection chamber and dispensing means being constructed to retain the transferred corn in the collection chamber during said delivery of corn to the collection chamber and during said ejection of said one container.

18. A popcorn dispenser comprising a housing having a top wall with a transparent portion, a storage chamber within the housing for containing popcorn to be dispensed, an overflow collection chamber carried by the housing, adapted to contain a predetermined quantity of popcorn and to overflow downwardly any corn received in excess of said quantity, means for creating a flow of air upwardly within the housing and toward said top wall thereof, means for entraining corn from the storage chamber in said flow of air to pass upwardly therewith, means for directing the corn thus entrained along the inside of said transparent portion of the top wall within sight from the outside of the housing and then into said collection chamber, excess corn overflowing from said collection chamber, and dispensing means for discharging the corn from said collection chamber to a location accessible from the outside of the housing, said collection chamber and dispensing means being constructed to retain the transferred corn within the collection chamber during said delivery of corn to the collection chamber.

19. A popcorn dispenser comprising a housing having a top wall with a transparent portion, a storage chamber within the housing beneath said top wall for containing popcorn to be dispensed, an overflow collection chamber within the housing adapted to contain a predetermined quantity of popcorn and opening into an upper portion of the storage chamber to overflow downwardly any corn received in excess of said quantity, means for creating a flow of air upwardly within the storage chamber to entrain corn and carry it upwardly toward said top wall, means for directing the corn thus entrained along the inside of said transparent portion of the top wall within sight from the outside of the housing and then into said collection chamber, excess corn overflowing from said collection chamber into the storage chamber, coin responsive means controlling the delivery of corn to the collection chamber by said flow creating means, and means for dispensing the corn from said collection chamber to a location accessible from the outside of the housing.

20. A popcorn dispenser comprising a housing having a top wall with a transparent portion, a storage chamber within the housing for containing popcorn to be dispensed, an overflow collection chamber within the housing adapted to contain a predetermined quantity of popcorn and to overflow downwardly any corn received in excess of said quantity, a perforated screen received in an opening at the bottom of the storage chamber, means for creating a flow of air upwardly through said screen and into the storage chamber to entrain corn therein and move it upwardly, a vertically extending tube in the storage chamber having a lower end spaced above said screen to receive the corn and conduct it upwardly toward said top wall, means for directing said upwardly moving corn generally horizontally along the inside of said transparent portion of the top wall within sight of an operator and then into the collection chamber, coin responsive means controlling the delivery of corn to the collection chamber by said flow creating means, and means for dispensing the corn from the collection chamber.

21. A popcorn dispenser comprising a housing, a storage chamber in the housing for containing popcorn to be dispensed, an overflow collection chamber within the housing adapted to contain a predetermined quantity of popcorn and to overflow downwardly any corn received in excess of said quantity, a blower within the housing operable to create a flow of air therein, means for entraining corn from the storage chamber in said flow of air and then directing the entrained corn into the collection chamber, coin responsive means for controlling the delivery of corn to the collection chamber by said blower, and means operable to dispense the corn from the collection chamber to a location accessible from the outside of the housing.

EARNEST E. MARTIN.

References Cited in the file of this patent

UNITED STATES PATENTS

| Number | Name | Date |
| --- | --- | --- |
| Re. 2,679 | Brock | July 16, 1867 |
| 310,905 | Milbank | Jan. 20, 1885 |
| 720,638 | Tokheim et al. | Feb. 17, 1903 |
| 873,300 | Cranston | Dec. 10, 1907 |
| 1,267,730 | Wolfe | May 28, 1918 |
| 1,298,265 | Trip | Mar. 25, 1919 |
| 1,347,358 | Adams | July 20, 1920 |
| 1,661,299 | Peron | Mar. 6, 1928 |
| 1,985,947 | O'Mara | Jan. 1, 1935 |
| 2,032,259 | Chandler | Feb. 25, 1936 |
| 2,051,344 | Parks et al. | Aug. 18, 1936 |
| 2,125,086 | Rourke | July 26, 1938 |
| 2,236,548 | Prouty | Apr. 1, 1941 |
| 2,252,101 | Tveter | Aug. 12, 1941 |
| 2,258,548 | Doutrich | Oct. 7, 1941 |
| 2,509,985 | Morrow | May 30, 1950 |